(12) United States Patent
Vasquez et al.

(10) Patent No.: US 10,023,290 B2
(45) Date of Patent: Jul. 17, 2018

(54) OPTICAL WINDOW SYSTEM WITH AERO-OPTICAL CONDUCTIVE BLADES

(71) Applicant: Raytheon Company, Waltham, MA (US)

(72) Inventors: David A. Vasquez, Gardena, CA (US); Michael Ushinsky, Irvine, CA (US); Joseph J. Ichkhan, Redondo Beach, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 15/678,589

(22) Filed: Aug. 16, 2017

(65) Prior Publication Data

US 2017/0341726 A1    Nov. 30, 2017

Related U.S. Application Data

(63) Continuation of application No. 14/330,493, filed on Jul. 14, 2014.

(51) Int. Cl.
*G01J 5/00* (2006.01)
*B64C 1/14* (2006.01)
(Continued)

(52) U.S. Cl.
CPC ............ *B64C 1/1484* (2013.01); *B32B 37/30* (2013.01); *B64C 1/1492* (2013.01); *B64C 21/00* (2013.01);
(Continued)

(58) Field of Classification Search
CPC ........ G01J 5/20; G01J 5/08; G01J 5/02; G01J 5/10; H04N 5/33
See application file for complete search history.

(56) References Cited

U.S. PATENT DOCUMENTS 1,929,892 A    10/1933    Kellner
2,203,174 A     6/1940    Muttray et al.
(Continued)

FOREIGN PATENT DOCUMENTS

EP      1 209 075 B1    8/2006
EP      1 618 357 B1    9/2010
WO    2012/136239 A1   10/2012

OTHER PUBLICATIONS

International Search Report and Written Opinion for corresponding Patent Application No. PCT/US2015/021744 dated Jun. 10, 2015.
(Continued)

*Primary Examiner* — David Porta
*Assistant Examiner* — Mamadou Faye
(74) *Attorney, Agent, or Firm* — Renner, Otto, Boisselle & Sklar, LLP

(57) ABSTRACT

A method of improving optical characteristics of an optical window operating in a flow of fluid and having first and second panes of optically transmissive material—each having an edge adjacent to, parallel with, and at least partially coextensive with each other—is described herein. The method includes inserting a thermally conductive blade between two adjacent edges of the first and second panes of optically transmissive material; and lifting an adverse flow stagnation zone forward of the optical window by protruding the thermally conductive blade into the flow of fluid from an outer surface of the panes of the optical window.

20 Claims, 7 Drawing Sheets

(51) Int. Cl.
| | |
|---|---|
| *F42B 15/34* | (2006.01) |
| *F42B 10/46* | (2006.01) |
| *B64C 23/06* | (2006.01) |
| *B64C 21/00* | (2006.01) |
| *B32B 37/30* | (2006.01) |
| *H05B 3/84* | (2006.01) |
| *B64D 47/08* | (2006.01) |

(52) U.S. Cl.
CPC .............. *B64C 23/06* (2013.01); *F42B 10/46* (2013.01); *F42B 15/34* (2013.01); *H05B 3/84* (2013.01); *B64C 2230/10* (2013.01); *B64D 47/08* (2013.01); *Y02T 50/162* (2013.01); *Y02T 50/166* (2013.01)

(56) References Cited

U.S. PATENT DOCUMENTS

| | | | |
|---|---|---|---|
| 2,208,204 | A | 7/1940 | Vigroux |
| 2,823,612 | A | 2/1958 | Cox et al. |
| 3,293,437 | A | 12/1966 | Boydell |
| 3,672,109 | A | 6/1972 | Erck |
| 5,333,428 | A | 8/1994 | Taylor et al. |
| 6,296,377 | B1 | 10/2001 | Wilson et al. |
| 6,729,082 | B1 | 5/2004 | Oldham |
| 9,575,219 | B2 * | 2/2017 | Ravichandran ........ B82Y 20/00 |
| 2007/0029438 | A1 | 2/2007 | Arata |
| 2007/0295856 | A1 | 12/2007 | Schulein |
| 2011/0204037 | A1 | 8/2011 | Seaborn |
| 2012/0234395 | A1 | 9/2012 | Kremeyer |
| 2013/0140006 | A1 | 6/2013 | Johnson, Sr. |

OTHER PUBLICATIONS

NAVORD Lab Report No. 3834: "Stagnation Temperature Probes for use at High Supersonic Speeds and Elevated Temperatures," (1954).

Antonia, R.A et al., "The Response of a Turbulent Boundary Layer to an Upstanding Step Change in Surface Roughness," Trans. ASME, Journal, (1971), vol. No. 93, pp. 22-34.

Desandre, L.F., "Optical Performance Analysis of Standard Missile Block IV A Seeker," Research Department of Naval Air Warfare Center Weapons Division, (1999), China Lake, CA.

Hardy, J.K. et al., "Kinetic Temperature of Propeller Blades in Conditions of Icing," R & M No. 2806 IO, 696, A.R.C. Technical Report, (1954).

Harris, D.C., "Materials for Infrared Windows and Domes: Properties and Performance," SPIE Optical Engineering Press, (1999), pp. 30-36, 63-81, 215-273, Bellingham, WA.

Jacobi, I. et al., "New Perspectives on the Impulsive Roughness-Perturbation of a Turbulent Boundary Layer," Journal of Fluid Mechanics, (2011), vol. No. 677, pp. 179-203, Cambridge University Press 2011.

Mafusire, Cosmas et al., "Aero-Optics: Controlling Light with Air," Chapter 29, (2012), Intech.

Nobel, Park S., "Boundary Layers of Air Adjacent to Cylinders," Plant Physiol, (1974), 54, pp. 177-181.

Northwang, G.J., "An Evaluation of Four Experimental Methods for Measuring Mean Properties of a Supersonic Turbulent Boundary Layer," Ames Aeronautical Laboratory, (1956), Moffett Field, CA.

* cited by examiner

Region available for insert

OPTICAL WINDOW SYSTEM WITH AERO-OPTICAL CONDUCTIVE BLADES

This is a continuation of U.S. application Ser. No. 14/330,493, filed Jul. 14, 2014, which is incorporated by reference herein in its entirety.

FIELD OF INVENTION

The present invention relates generally to windows used in the aerospace industry and more particularly to multi-segmental infrared windows primarily utilized in different forward looking infrared surveillance and tactical systems, including targeting and designation applications.

BACKGROUND

The windows used in aerospace applications, especially forward-looking surveillance and tactical systems, are one of the most demanding applications for the single crystal or polycrystalline ceramics. They must strongly withstand severe aero-thermal heating, thermal shock resistance, rain drop and sand erosion, etc. Among the most suitable materials characterized by high strength and reasonable thermal conductivity in combination with high optical transmission over a broad wavelength ranges are ZnS, ZnSe, sapphire, and spinel. A few cost-effective and nearly net-shape fabrication processes were developed in the past 20-30 years to fulfill the requirements for successful infrared windows. The most effective commercial infrared window materials include multispectral zinc sulfide and polycrystalline sapphire. In both of these examples, the single and multi-segment windows were produced primarily by time-consuming metallurgical processes and grinding/polishing to achieve the required precise optical tolerance and good transparency in both the visible and the infrared bands.

As surveillance and tactical applications become more critical at increased flight speeds and over a high range of altitudes and aircrafts, there is a strong need to improve the performance of the infrared systems to provide higher quality signal transmission and advanced imaging overcoming aero-optical limitations.

SUMMARY OF INVENTION

There is also a strong need for a cost-efficient way of fabricating large-size and trapezoidal-shape window segments from the hard-to-machine crystal and ceramic materials. This in turn requires substantial improvements in window performance, primarily addressing aero-optical and thermo-elastic behavior in supersonic/hypersonic flight as well as low speed and high altitude regimes. Thus, the suggested innovation is primarily focused on the features and the segment integration that are associated with the aero-thermal heating with rapid heating rates and non-uniformity of thermal fields in multi-segmental infrared windows. In particular, exemplary embodiments feature equalizing thermal fields in front of an infrared window, affecting positioning of its thermal and pressure stagnation, and modifying turbulent boundary layer in close proximity to the infrared window.

Therefore, according to one aspect of the invention, an optical window for use in a fluid (e.g., air) flow includes a first pane of optically transmissive material; a second pane of optically transmissive material having an edge adjacent to, parallel with, and at least partially coextensive with a corresponding edge of the first pane; and a blade made of thermally conductive material positioned between the adjacent edges of the first and second panes; wherein the blade extends beyond a surface of the panes into the turbulent flow.

Optionally, the panes are angled with respect to each other forming a convex side exposed to the flow, and wherein the blade extends from the convex side of the panes.

Optionally the said angles are arranged to minimize radar cross-section and infrared recognition of the optical window, thereby providing a stealth effect.

Optionally, the blade has a head that extends along the adjacent edges defining a height of the blade, and a body extending from the head toward the pane edges defining a depth of the blade.

Optionally, the head is spaced from the surface of the panes protruding into the flow and the body extends between the adjacent edges of the panes.

Optionally, the body of the blade is thinner than the head in a direction perpendicular to the depth and the height.

Optionally, at least a portion of the blade is moveable with respect to the panes and spacing between a leading edge of the blade and the panes is controllable.

Optionally, the optical window includes a heating element thermally associated with the blade and controllable to heat the blade.

Optionally, the optical window includes a third pane having an edge adjacent to, parallel with, and at least partially coextensive with a second edge of the first pane; and a second blade made of thermally conductive material positioned between the adjacent edges of the first and third panes. The second blade may extend beyond the surface of the panes into the flow.

Optionally, the cross-section of the first blade taken in a plane perpendicular to the adjacent edges of the first and second panes is the same as the cross-section of the second blade.

Optionally, the cross-section of the first blade taken in a plane perpendicular to the adjacent edges of the first and second panes is different than the cross-section of the second blade.

Optionally, the optical window includes a thermally conductive frame in which the panes are disposed and adhesively bonded to.

Optionally, the blade is thermally coupled to the conductive frame.

Optionally, the panes are flat.

Optionally, the blade has an arrow-shaped cross-section taken in a plane perpendicular to the adjacent edges.

According to another aspect of the invention, a method of improving optical characteristics of an optical window operating in a flow of fluid (air) and having first and second panes of optically transmissive material each having an edge adjacent to, parallel with, and at least partially coextensive with each other is provided. The method includes inserting a thermally conductive blade between two adjacent edges of the first and second panes of optically transmissive material; and lifting an adverse flow stagnation zone forward of the optical window by protruding the thermally conductive blade into the flow of fluid from an outer surface of the panes of the optical window.

Optionally, the step of lifting includes spacing a head of the blade from the surface of the panes.

Optionally, the method includes moving at least a portion of the blade with respect to the panes to control spacing between a leading edge of the blade and the panes.

Optionally, the method includes heating a heating element thermally associated with the blade to heat the blade.

Optionally, the method includes disposing the panes in and adhesively bonding the panes to a thermally conductive frame.

Optionally, the method includes thermally coupling the blade to a conductive frame.

The foregoing and other features of the invention are hereinafter described in greater detail with reference to the accompanying drawings.

DETAILED DESCRIPTION

Figure 1:
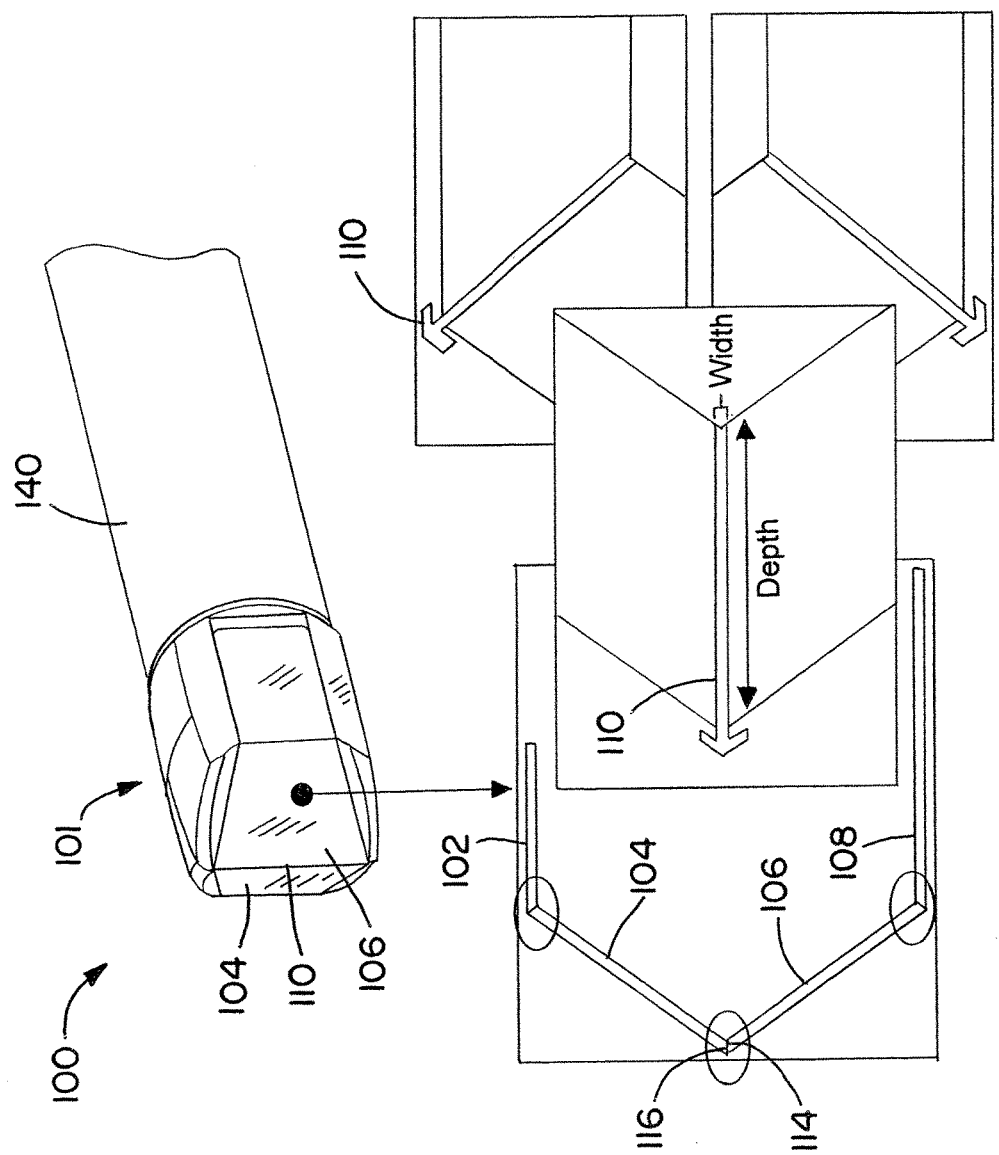
FIG. 1 shows an exemplary optical sensor pod having conductive blades inserted between segments of the window.

The introduction of a thermally conductive structural element into a boundary layer affects the aerodynamics of turbulent flow itself and therefore changes the magnitudes of thermal gradient in front of a window or a wall. In particular, adverse effect of turbulence on structural and aero-optical performance of infrared windows can be reduced by introduction of thermally-conductive structural members into the highly perturbed boundary layer. For example, a turbulent boundary layer over a flat plate has been perturbed by a short strip of two-dimensional rough elements protruded in to the boundary layer. The recorded distribution of vortex cores has shown a distinct structural change in the flow associated with the perturbation. Discrete structures positioned in the flow field affect the localizations of vortex cores and the aggregate swirls. All of these features of the detailed perturbation by a rough strip provide the basic framework for development of a solution to alter and control turbulent boundary layers by exploiting the ability of small and localized perturbations caused by protruded blades to affect vast regions of flow. In particular, the downstream flow field in the wall vicinity can be predicted and controlled. It can be even modified by the predictably engineered localizations. Localizations can even change the aero-optical aberrations in the turbulent layer interfacing the infrared window.

Therefore, exemplary window systems provide a reduced aero-optical aberration infrared window also having an optimized/regulated aerodynamic pressure and thermo-elastic stress. Further, exemplary embodiments provide a tailorable optical window mounting system featuring conductive and other configured blades to reduce the window stress state and degrading optical effects.

The near-window turbulence and structural and thermal responses of window segments to the near-wall turbulence are primarily affected by a turbulent boundary or Prandtl layer with its forced convective heat transfer mode and certain air pressure. These responses are discussed in more detail below in relation to FIG. 4. The heat transfer in the Prandtl layer is characterized by a Nusselt (Nu) number (the ratio of convective to conductive heat transfer across the boundary), which is a function of Reynolds (Re) number (Re=Vc/v where V is the flight speed, c is the characteristic length, e.g., chord, and v is the kinematic viscosity of the fluid) and Prandtl (Pr) numbers (the ratio of momentum diffusivity or kinematic viscosity to thermal diffusivity). These parameters in turn depend on aerodynamics of the aircraft and operational flight conditions. The structural and thermal behavior of window segments can be detailed by taking into consideration the speed, acceleration, altitude, density of atmosphere, and a few more basic parameters of the flight, as well as the selected window materials. In contrast to laminar flow that is essentially parallel to the window surface, highly turbulent flow in close proximity of an infrared window is characterized by very high Reynolds number leading to a much higher Nusselt number, resulting in increased heat transfer. The turbulence in the boundary layer mixes the air by "entraining" cold fluid from the bulk flow near to the window and takes hot fluid proximate the window and transports that hot fluid away into the bulk flow where it mixes with cold bulk fluid. Both these mechanisms of air mixing promote efficient heat transfer in the Prandtl layer. The heat transfer that is driven by these mechanisms is also accompanied by variation in air pressure acting on the window. Typically, an increase in turbulence causes a drop in air pressure. That drop in pressure depends not only on the flow factors, such as Nu, Re, and Pr, but on the configuration of window frontal and side segments, their spans and thicknesses, stiffness of window segments, and several more parameters.

Exposure to a range of pressure and temperature conditions in the dynamic/turbulent flow subjects the window to intense convective heat loads. These thermal loads stem from the rise in temperature of the boundary layer formed in close proximity to the window's front surface or from the drop in surface temperature at high altitude. These loads depend substantially on the shape, thickness, and other parameters of multi-segmental windows, as well as on the thermo-mechanical properties of the window material(s). The loads also depend on boundary conditions on edges of the segments involving both the essentially insulating window and the thermally conductive metal frame of the sensor pod. The thermal response of the window results in temperature gradients through the thickness along the span, which generate transient stresses that may exceed the tensile strength of the window material or cause excessive normal deflections reducing its operational performance. Moreover, the gradients of thermal stresses can be very high, such that the stress intensity factor(s) may approach the fracture toughness of the selected window material, therefore causing inevitable thermal-shock-induced fracturing. Optical coatings deposited on the window surfaces are also impacted by the thermal state, especially due to substrate coefficient of thermal expansion mismatch and related bimetallic effects. The transient value of stress intensity, in turn, depends on the nature of the specific heat flow and is essential for the boundary layer in close proximity to the window's front surface. The near wall turbulent flow is characterized by the Biot (Bi) number (the ratio of the heat transfer resistances inside of and at the surface of a body) and Eckert (Ec)

number (the ratio of a flow's kinetic energy and enthalpy) affecting the heat transfer in the near window boundary layer. The allowable heat flux depends not only on intrinsic material properties of window material, but also on the local and coordinate-dependent heat transfer coefficient. Since most of the materials that possess favorable optical properties in the infrared bands, including the said ZnS, ZnSe, sapphire, and spinel are brittle, the selection of an appropriate infrared material and optimization of other window parameters requires assessment of the aero-optical performance combining its electro-optical and thermo-mechanical characteristics in different flight conditions.

The physical parameters for the windows include the selection of appropriate material depending on the transmission bands to be addressed; evaluation of the window configuration, which differs for single- and multi-segmental embodiments; evaluation of span and thickness of the window and actual boundary conditions on the edges of the windows, reflecting the clamping of window segments; and the preferred integration techniques for all infrared segments mounted to a pod structure. In addition to these constraints, the thermo-elastic stress resistance to thermal loads often differs for the so-called "thin" and "thick" windows. The "thin-plate" windows follow an approach which neglects transverse shear deformation, whereas "thick-plate" windows follow an approach which accounts for the shear behavior of window segments. Shear deformation tends to be important and must be taken into account when the segment thickness is smaller than approximately $1/10$-$1/20$ of the segment span. The contribution of shear also becomes significant in locations of bending-stress concentrations, which occur near the localized changes in thickness or support conditions or re-entrant corners, which are typical for all multi-segmental embodiments. In the practical implementation case, most conventional embodiments relate the "thin" or "transitional" windows to "thick" windows, and the thermal performance of a "thick" window is controlled by its thermal figure of merit. In the embodiments to be detailed below, mitigation of the thermal and stress resistance of a thickness-optimized window in terms of either the reduced heat load and/or the allowable stagnation temperature may be important.

The multi-segmental embodiments illustrated and described herein adequately reduce the adverse effect of turbulence on structural and aero-optical performance of infrared windows. In particular, the excessive aero-optical aberration of infrared windows is reduced and aerodynamic pressure and thermo-elastic stress are equalized and minimized. These effects are achieved by introduction of thermally-conductive structural members or "blades" into the "near window" boundary layer and their integration with the infrared window segments and the pod enclosure. The materials, dimensional and structural parameters of these blades are detailed below.

The aero-optical effects on the performance of different forward looking infrared surveillance and tactical systems, including targeting and designation systems, is closely associated with the behavior of near-window turbulent layer with its accompanying temperature and pressure fields. The pressure and temperature are essentially non-uniform and often characterized by large gradients. The beam path conditioning, including the refractive index variations and inevitable optical aberrations, induced by turbulent boundary layers typically degrade the performance of these surveillance and tactical systems. The above-described air mixing in the near-window turbulent layer affects the refractive-index variations arising from the air mixing of different streams and creating density variations in air. The density gradients correlate to variable refractivity of air in proximity to windows. The air pressure gradients, in turn, are typically associated with the turbulent air flow of the conditioned air through the operational optical beam path. The density variation is proportional to the square of the flow speed and differs dramatically for different flight conditions (high altitude, low speed vs. low altitude, high speed and acceleration). Computer-aided simulations carried out to address the aero-optical distortions caused by Mach 0.5 to Mach 2.0 flight conditions illustrate the effect of optical aberrations associated with aerodynamics of near window turbulence at moderately high and high Reynolds (Re) numbers. The anticipated fluctuations of refractivity depend on the density field, wave front distortions of operational optical beams, as well as on size of aperture, small-scale turbulence within the effective thickness turbulent layer, including its effective viscosity and buffering parameters. Several relatively simple expressions were suggested in the past for estimating the effective thickness of the boundary layer of air in the near-wall proximity, as well as in proximity of different bodies of revolutions, say cylinders or spheres. They can be used as reliable first approximation for the evaluation of effective thickness for different flight conditions.

Referring now to FIG. 1, exemplary systems include thermally conductive blades that may be positioned in front of the window within the turbulent layer associated with the window.

In order to reduce the impact on optical performance and simplify construction, the blades may be located within the seams of faceted window structures.

The blades also may be implemented in conjunction with a thermal control system that enables perimeter heating of the windows to mitigate thermal elastic distortion (will be detailed below). Finite element simulations carried out for different windows having conductive blades protruded into the Prandtl's layer show a significant (up to 25%) reduction in thermo-elastic distortion, when the window temperatures were actively controlled with applied heat. Heating elements can be mounted to the conductive blades and may also utilize Joule heating (i.e. passing an electric current through a conductor to release heat) with selective material properties, for which the local resistivity increases at lower temperatures and therefore provides a synergistic system response favorable for thermal control. A localized Joule heating response will naturally generate more thermal dissipation where colder temperatures preside.

External to the window, conductive blades will trip a turbulent boundary layer response that enhances mixing of heated air spilling over the outer window surface and provides the possibility to control the air density and index of refraction.

Heating elements associated with the blades may be formed from electrically resistive alloys and can be fabricated from solid sheet or wire metal components. The heating elements can include bimetallic thermocouples and optical fiber interferometer therefore actively controlling temperature field. All other known methods of temperature control and thermal management can be applied as will be understood by those skilled in the art.

The conductive blades change the aerodynamics of near window turbulence in its dynamic and thermal aspects providing improved beam path conditioning for the optical beams.

FIG. 1 shows an example of a faceted pod window architecture at 100. The example depicts a multi-segmental (four pane) case. It also shows schematically in top-view conductive blades 110 embedded in seams of a window 101. The window 101 includes four panes 102, 104, 106, and 108.

Each pane includes four edges. Referring specifically to pane 104, the pane has an edge 114 that is adjacent to and parallel with an edge 116 of pane 106. The edges are shown as being completely coextensive; however it is possible in some embodiments to have adjacent panes with edges that are only partially coextensive.

The segmented window 101 is here shown with all panes being angled with respect to each other forming a convex side exposed to the flow. However, it is possible to have one or more pairs of panes disposed in parallel relation with a blade disposed therebetween, or even one or more panes forming a concave outer surface, depending on the desired application. The windows may also be angled so as to reduce the radar cross-section and infrared recognition of the sensor pod, thereby creating a stealth effect for the sensor pod.

The thermally conductive blades are located between the window segments (panes) at each interface. In particular, the leading blade 110 is positioned between the adjacent edges 114, 116 of the panes 104, 106. As shown in the inset details of FIG. 1, the blade 110 extends beyond a surface of the panes into the flow; in this case, on the convex side of the panes.

Although a preferred material for the blades 110 is aluminum due to favorable material qualities and relatively low cost, in other embodiments, the blade can be also formed by a thermally conductive bi-material composite. In particular, a metal-graphite blade having higher thermal conductivity of its graphite constituent and structural stiffness facilitated by its aluminum constituent may be advantageous. In further arrangements that composite can be formed by a yarn of CNT (carbon nanotube) and aluminum. The composite blade allows for better integration of its metal part with the identical or similar metal (alloy) of the pod.

Figure 2:
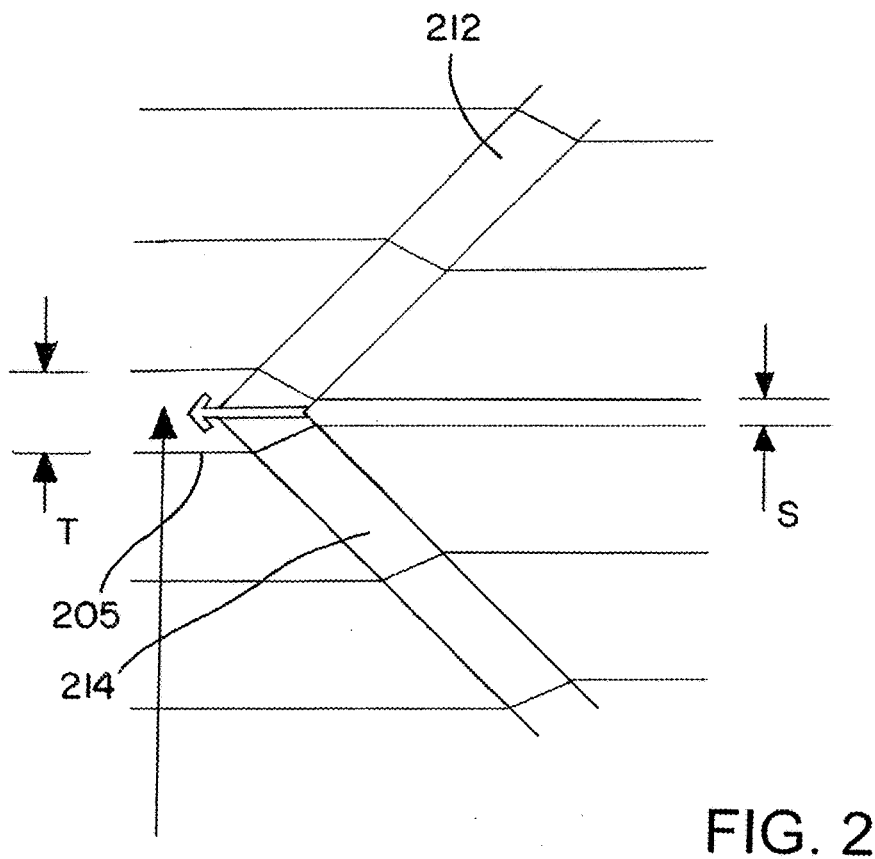
FIG. 2 shows a schematic diagram of the optical field providing a region of no occlusion caused by the blade insert.
Figure 3:
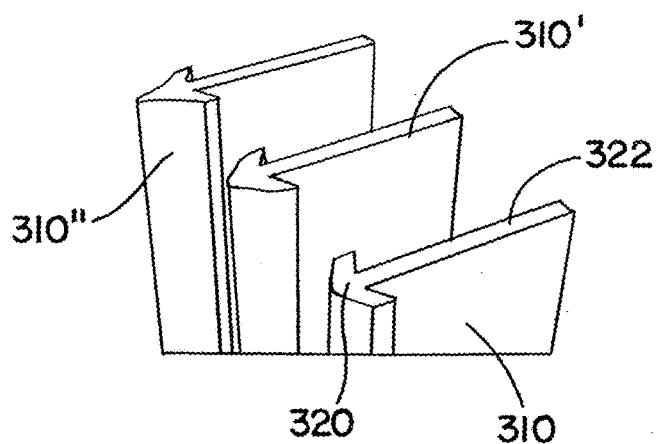
FIG. 3 shows exemplary blade cross-sections.

The width of the blade itself is small enough that it does not exceed the width of the window segment and results in minimal optical obscuration (as shown in FIG. 2). The optimum dimensional parameters of the blade can be established on the basis of optical and thermo-mechanical analyses known to those with skill in the art after reading and understanding the present disclosure. The width and shape of the blade can be further optimized to withstand the turbulent airflow and provide sufficient thermal management possibilities (as shown in FIG. 3). This can be achieved primarily by properly forming the shape of blade and its tip, selecting the high thermal conductivity of its alloy and the straightforward thermal path.

At each window pane junction, similar or different shaped blades can be installed. In some exemplary embodiments, therefore, a four-pane window may include three similarly shaped blades, while in other exemplary embodiments, a four-pane window may include an blade with a first profile in the leading or forward-most position and two blades with a second profile in each of the laterally-offset positions.

The optical system may include a metal pod frame 140 connected to the multi-segment infrared window 101 and housing various equipment (not shown) such as optical sensors and the like. Exemplary pods may be fabricated from aluminum alloys widely used in aerospace technology. These alloys are typically characterized by low density, reasonably high elastic moduli, and high thermal conductivity and diffusivity.

The illustrated window is formed by four planar segments (panes) of a precisely polished infrared-transmissive material. Among the most applicable pane materials are poly-crystalline ZnS, ZnSe, sapphire, and spinel plates, although other materials are possible. The window surface may have a conductive Electro-Magnetic Interference (EMI) type coating (not shown). The length and width of infrared window segments can vary, but are typically from about 12.7-50.8 cm (5 to 20 inches). Thicknesses of exemplary window segments may be from about 0.32-2.54 cm (⅛ to 1 inch), for example.

Referring now to FIG. 2, a schematic optical flow diagram is shown with ray lines 205 demonstrating how the nature of two panes 212, 214 coming together at an angle allows for a region available for a blade that is substantially wider, T, than the thickness, S, of the seam between the panes.

Referring in detail to FIG. 3, blades 310, 310', and 310" are shown in detail to clearly depict the cross-sectional shape of a blade and demonstrate example variations in blade geometry.

In particular, blade 310 has a head 320 that, when the blade 310 is inserted between two panes, would extend along the adjacent edges of the panes. For convenience, this dimension is referred to herein as a "height" of a blade. The height of a blade may be any appropriate height based on predicted flow characteristics for a particular application. In exemplary embodiments, the height of the blade may be the same as the length of the adjacent pane edges, for example. Blade 310 also includes a body 322 extending from the head toward the pane edges. As shown in FIG. 1, the dimension along this extent is herein referred to as "depth." Whereas the head 320 of the blade protrudes away from the window panes, the body 322 may extend between adjacent edges of the panes. In exemplary embodiments, the body 322 of the blade is thinner than the head 320 (in a direction perpendicular to the depth and the height, defined in FIG. 1 as "width").

The head 320 of blade 310 is generally arrow shaped with two substantially linear backward-swept arms. In contrast, although still arrow-shaped, the heads 320' and 320" of blades 310' and 310" are more complex shapes that include a pronounced leading edge with curving backward swept arms. The examples illustrated here are not meant to be exhaustive; rather these illustrative examples are meant to convey to one having skill in the art that there are various shaped blades which will be effective to different degrees, depending on the application. Furthermore, the profile of blades in a single window structure may be identical or different. For example, performance may be improved if a leading blade has a first profile while laterally-spaced blades may have a second, different profile. This improvement may be caused by differences in the flow and/or by the angle of attack of the blades, for example.

Figure 4:
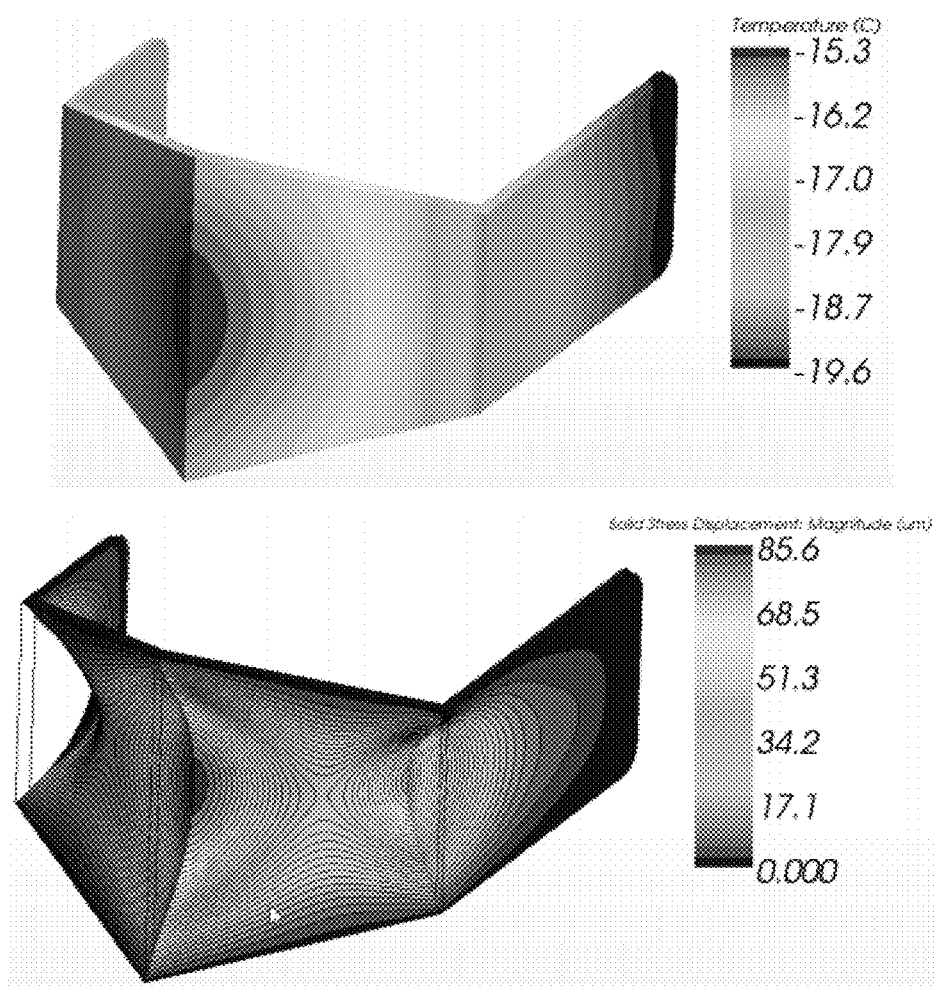
FIG. 4 shows an example of temperature and stress gradients in an uncompensated flight condition.

FIG. 4 shows the temperature distribution and window distortions resulting from air pressure and thermal elastic strain due to non-uniform distribution of temperature. (Note that the −15.3° C. end of the scale corresponds to the front center of the window while the −19.6° C. end of the scale corresponds to the back sides of the window. Similarly, the high end of the solid stress displacement scale corresponds to the center of each window segment joint while the low end of the scale corresponds to the edges of the panes away from the joints.) The illustrated example shows the problem conventional windows encounter in operation. Exemplary windows reduce these thermal and pressure stresses and result in better optical performance.

In the computational fluid dynamics (CFD) model illustrated in FIG. 4, the window was fully constrained about the perimeter of the window within a physical pod representation and an operational flight condition equivalent to air-speed Mach 0.8 at an altitude of 30 kft. Simulation results were converged upon in three stages to resolve the following details: (1) the aero-thermal flow field response imposed at the surface of the optical window, (2) the optical window distortions imparted by the pressure field, and (3) the accumulative window distortions caused by both pressure and thermal elastic gradients imposed on the windows. In summary, the analysis shows that the dominating force causing solid distortions in the optical window is driven by the coefficient of thermal expansion and window surface temperature deviation from the material reference temperature. High altitude operational conditions pose a harsh thermal environment with colder air temperatures.

Aerodynamic and structural analyses indicate that the temperature gradients and cross-plane deflections in window segments shown in FIG. 4 are often excessive for different altitudes and flight regimes replicating the actual flight parameters. However, the excessive temperature gradients and cross-plane deflections can be reduced by means of exemplary windows.

Several thermal management approaches to resolve temperature induced strain are described below. In these embodiments, the thermal control surfaces are not limited to window blades, but may also be embedded within the pod structure itself. Therefore exemplary embodiments may integrate the relatively low thermal mass blades with the much larger thermal mass of the pod structure. This allows for quicker transient temperature response and management.

The protrusion of the arrow-shaped blades into the near-window turbulent layer may be selected based on finite element analysis (FEA) simulations and limited by the effective thickness of turbulent layer that corresponds to the window construction and the conditions of its flight aerodynamics. In practical applications the protrusion of blades varies from 0.1 to 0.5 times the established effective thickness of the turbulent layer. Further optimizations may be made based upon structural and thermal conditions of the selected window, blade and pod by those skilled in the art upon reading and understanding the present disclosure.

Figure 5:
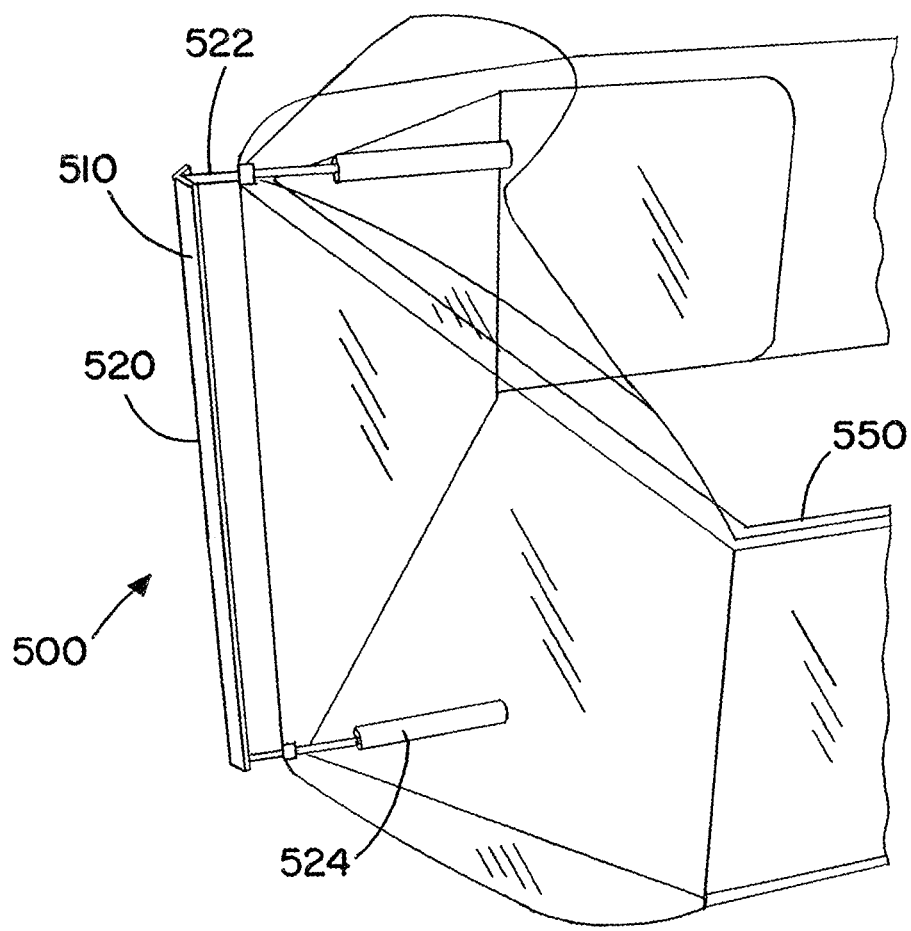
FIG. 5 shows an exemplary window assembly having a servo-mechanized blade with variable spacing between the blade and the window panes.

Referring now to FIG. 5, an exemplary window 500 includes a blade 510 positioned in front of the infrared window panes in proximity to the turbulent layer. The blade 510 may be attached (preassembled) to the frame 550 and constrained only in two, three, or more local areas of the interface. As shown the blade is attached via its ends, which have body segments 522 extending backward therefrom. The blade 510 protrudes longitudinally into the turbulent boundary layer. This protrusion may not exceed the effective thickness of turbulent layer. In FIG. 5 the protrusion is exaggerated for illustration.

Although a blade shaped with a head 520 and spaced body segments 522 may be statically mounted as described above, as shown the blade 510 is moveable with respect to the panes. This movability allows for control of the spacing between a leading edge of the blade and the panes via one or more motive devices 524 (e.g., linear actuators) that are stowed within the housing volume and have sufficient stroke to provide the variable and precise positioning throughout the boundary layer and for different flight conditions. A closed loop control feature allows adaptation to a broad flight envelope. In one simplified example, the blade may have two pre-programmed positions respectively corresponding to a low-speed, high-altitude regime and to a high-speed, low-altitude regime.

With the above-described embodiment, the air flow stagnation point temperature may be "lifted" from the frontal optical surface using an extended blade to divert flow. Performed simulations indicate that the lowered stagnation temperature and pressure result in a reduced frontal temperature distribution and smoother pressure distribution along the span of window segment.

Figure 6:
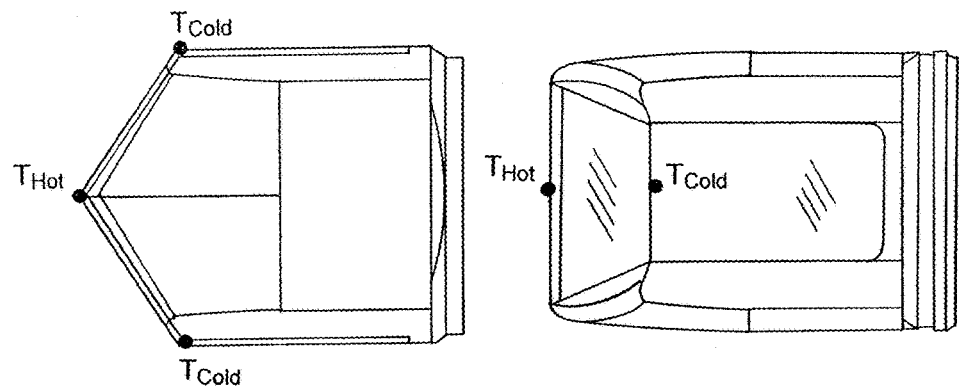
FIG. 6 shows a simplified thermal schematic of a window assembly.

FIG. 6 schematically shows a thermal field imposed by external flow field that emphasizes the location of hot and cold regions attributed to stagnations and flow separation.

The flow regions shown in FIG. 6 characterize the gradients and the respective changes between the detailed T hot zone, primarily driven by adiabatic compression and heating of the fluid, and T cold zone mainly induced by flow separation and the imparted expansion wave. The solid window temperature gradient determines thermo-elastic distortion of the window segments and depends on altitude of flight (1), acceleration/deceleration (2), overall Mach number (3), internal heat transfer situation (4), solar loading parameters (5) and a few other parameters.

In further embodiments, when preassembled with the pod frames, the metal or composite blades assume both passive and active thermal management options. The passive thermal management option includes an inserted thin metal strip adhesively bonded with window segments and a larger thermal mass metal frontal strip or extended blade to divert flow. That solution allows changing the temperature distribution around thermal stagnation point and facilitates the reduced temperature gradient. Finite element simulations carried out for the four segment window example indicate that the gradient may be reduced by about 25%. The magnitude of this reduction depends on the specific embodiment and can vary from about 10% to 30%. The equalization of temperature leads to the reduction of thermo-elastic stress in the window also affecting its dimensional parameters.

The window blades may also increase stiffness and provide strong structural integration and heat transfer path with the metal pod frame. The blade can be positioned partly between the crystal or ceramic segments and preassembled with the pod and partly moved to the turbulent layer in front of the window segments. The blade is also well structurally integrated with the pod along the edges or in several critical areas of those edges. Thus, the thermal path allows equalization of the high gradient thermal field also reducing the thermo-elastic stresses in infrared window segments.

The extended blade breaks frontal symmetry of the thermal field, so the air flow stagnation point temperature may be moved out of the optical surface, also leading to reduction of temperature gradient. Additionally, the air flow stagnation point temperature may be displaced from the frontal optical surface, therefore further equalizing the distribution of temperatures and reducing the thermal loading. The lowered stagnation temperature also results in a reduced temperature gradient along the span of window further reducing its thermal load and eventually the thermo-elastic stresses. The total reductions of the temperature gradient are dependent on the physical and dimensional parameters of the embodiment.

Significant change in window temperature and pressure gradients become more diffuse as the extended blade is moved from the surface of the window. Varying the distance of the extended blade for a given flight condition will allow for tuning of the flow field upstream of the window to mitigate the overall temperature gradient. This forms a possibility of an active device affecting temperature and stress distributions in close proximity of near-wall turbulent layer. Thus, in some embodiments, the blade can have a sliding arrangement and its arrow tip can be protruded inside of the turbulent layer.

In some embodiments, the active thermal management option includes a metal wire or strip heater attached to the arrow-shaped blades. Additional wires or strip heaters located within window bond lines may be used to control window temperatures and facilitate the appropriate temperature equalization. Having thermal and pressure feedback can also facilitate the active control of the window in turbulent flow with a possibility of thermal field correction.

Figure 7:
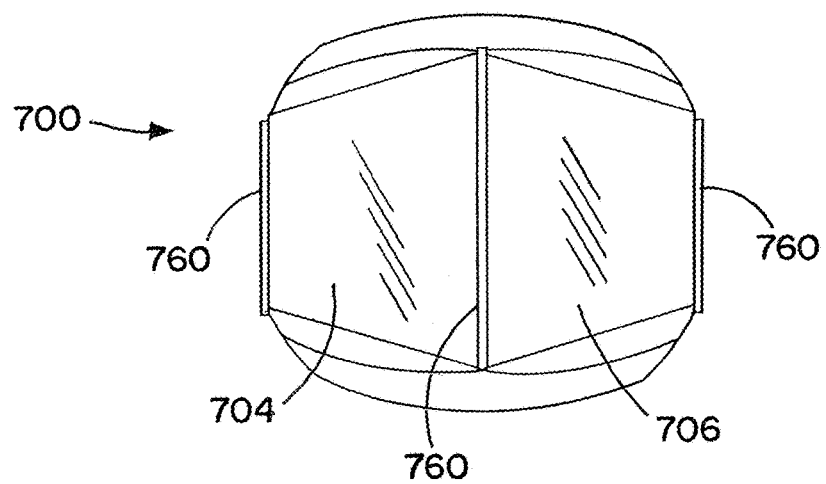
FIG. 7 shows an exemplary window assembly with heating elements to actively control heat distribution across the window assembly.

FIG. 7 shows a pod 700 including three metal wires or strip heaters 760 located within the window pane 704, 706 bond lines actively controlling the thermal field internal to the window. They may be used to control the window temperatures and correct them by means of resistive heat. The heating elements can be controlled via a closed loop system or a passive temperature look up table to adapt to broad flight envelope conditions, and potential controls may include heating power ranges from about 20 W to 125 W at each location. Each location may be controlled independently so that different heating locations are heated different amounts.

The wire or strip heater attached to the extended blade can be used to preheat air at higher altitude to reduce pressure and thermo-elastic distortions of window. These wires can be also connected to conductive, say EMI type, coatings covering frontal surfaces of the window segments. With this arrangement the active thermal management facilitates temperature equalization affecting both the cross-plane and in-plane gradients.

Figure 8:
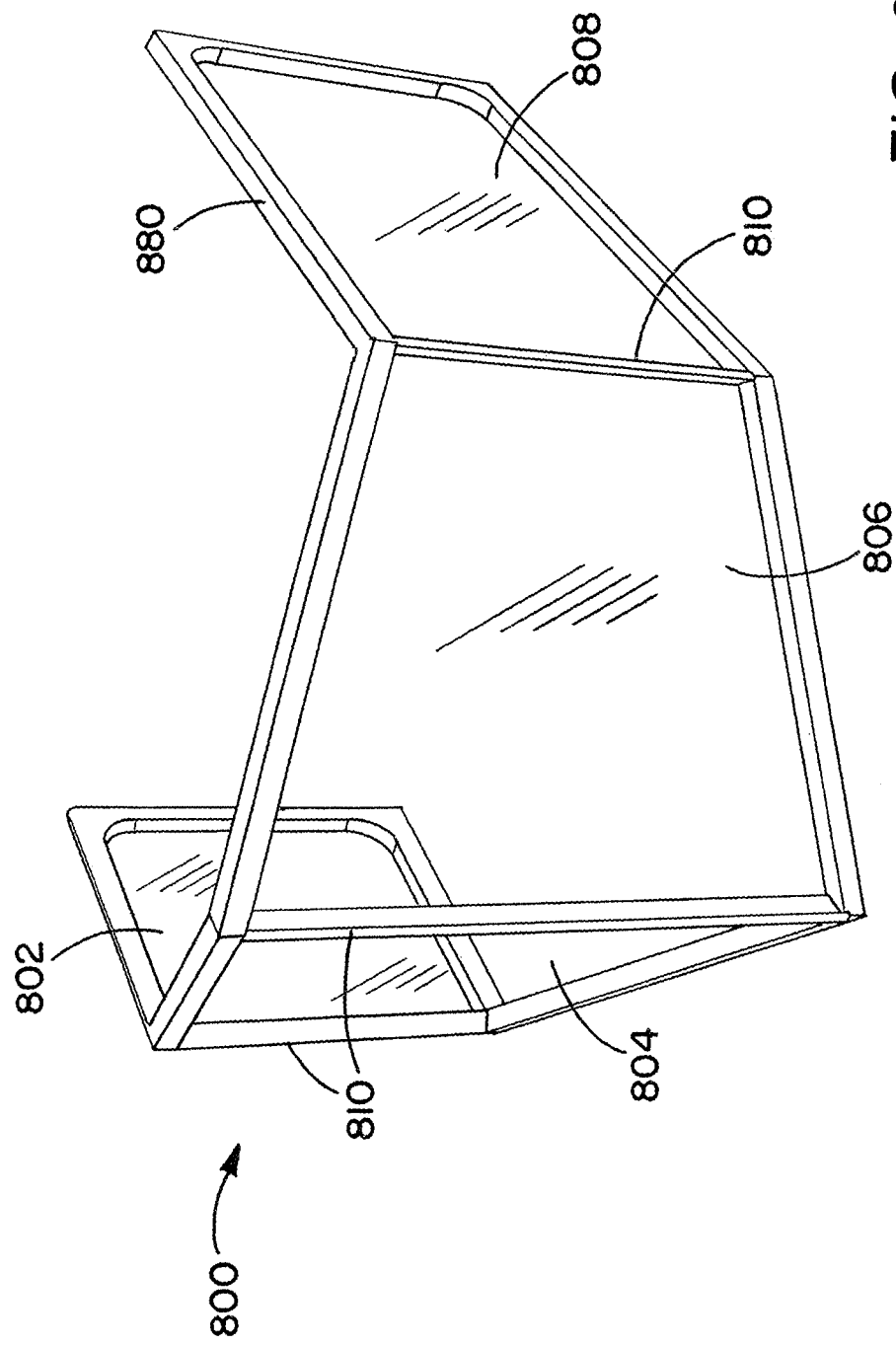
FIG. 8 shows an exemplary window frame assembly.

Referring now to FIG. 8, an exemplary window assembly 800 including a frame 880 for structurally integrating the window panes 802, 804, 806, 808 and blades 810 to the rest of the pod is shown. The structural integration assumes proper mounting with possibility of thermal conduction in the metal joints formed by the conductive (e.g., aluminum) blades and the conductive (e.g., aluminum) pod. The embodiment also provides increased thermal conductivity of the dissimilar window and metal interfaces. This thermal conductivity can be facilitated via conductive adhesives or metal soldering materials, for example.

The integration of the window segments into the frame 880 may be accomplished by adhesive bonding, or similar joining processes. The identical adherent bond lines on the edges involving ZnS, ZnSe, sapphire, and spinel materials can be formed by high moduli epoxies or other similar joining materials known in the art. These materials are generally characterized by the moderate density, very high elastic moduli, and low thermal conductivity and diffusivity as known to those skilled in the art. The edges of windows may be straight, or may have a convex or concave polish that will be demonstrated below in greater detail. The bond lines between the dissimilar materials, say metal-ZnS, for example, may be bonded by means of stress-isolating low moduli adhesive materials, such as RTV silicones.

Thus, the heat conduction in the window-pod interface is characterized by substantial interfacial thermal resistance aggravating heat sinking and further affecting non-uniform thermal stress distribution. Although a conductive frame that circumscribes all edges of the window is shown, other arrangements are possible. The frame may be fabricated from the same (e.g., aluminum alloy) material as the pod enclosure, providing efficient thermal conduction. The frame and pod may, for example, encapsulate an infrared multi-band telescope and the opto-electronic censoring system, typically providing a very large thermal mass as compared with its essentially insulated window segments of a much smaller thermal mass. For this reason conductive blades and pod should be properly integrated reducing the interfacial thermal resistance.

Figure 9:
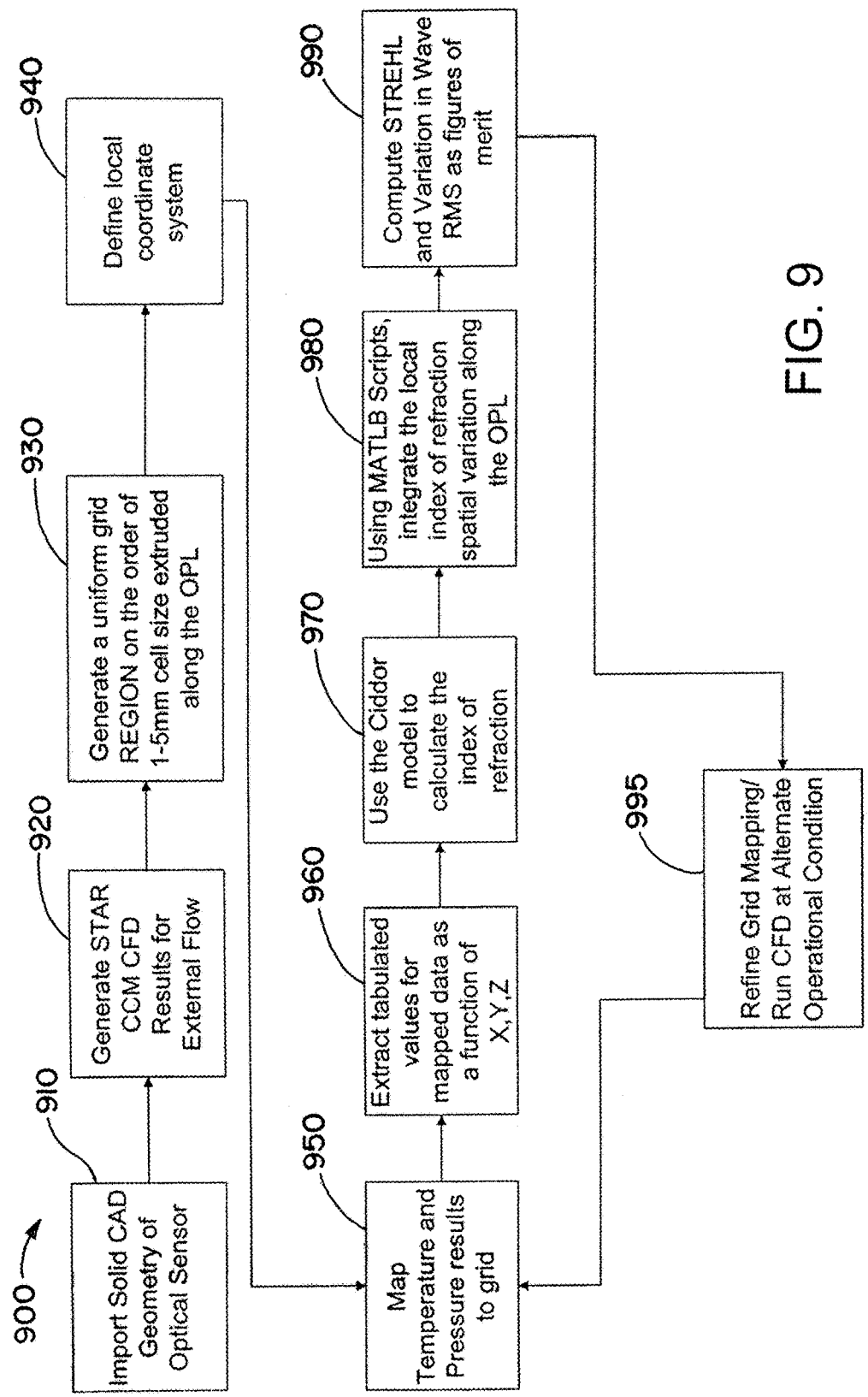
FIG. 9 shows an exemplary method of evaluating aero-optical wave front distortion for an optical sensor operating in a fluid flow.

Referring now to FIG. 9, shown is a method 900 that evaluates aero-optical wave-front distortion. A spherical configuration for the optical window allows appreciable reduction of the distortions as they pertain to tilt, focus, and computing the variation in wave root mean square (RMS) as figures of merit. The procedure addresses the changes in the wave-front distortions due to the implementation of conductive blades. As it is evident from numerical simulations, the variable refractivity of air in the Prandtl layer causes aero-optical distortions. These distortions are angle dependent and become more pronounced near the regions of flow separation. In the case of multi-segmental embodiments, the distortions are increased near the edges of window segments. With the proposed embodiment the blades additionally perturb the edge proximities and modify the turbulence. The embodiment enables more regular flow attachment to the window surface. Flat segments may be considered spheres of infinite radii. Therefore, the method detailed in FIG. 9 is fully applicable to any embodiment.

At block 910, the geometry of the optical sensor may be generated or imported to a computer system. For example, a solid CAD model of the window and pod may be generated. At block 920, computational fluid dynamics results may be obtained for the geometry modeled in block 910 when exposed to an external flow. As a specific example, STAR CCM Computaqtional Fluid Dynamics (CFD) results are obtained.

At block 930, a uniform grid region may be generated on the order of, for example, 1-5 mm cell size extruded along the Optical Path Length (OPL) associated with the optical sensor. Thereafter, at block 940, a local coordinate system may be defined for the grid.

At block 950, temperature and pressure results from the CFD simulation may be mapped to the grid; and at block 960, the computer may extract tabulated values for mapped data as a function of spatial coordinates of the grid (x,y,z). At block 970, the computer may calculate local indexes of refraction, for example, by using the Ciddor model. At block 980, the computer may integrate local index of refraction spatial variation along the OPL. At block 990, the computer may generate a STREHL ratio ($S=|<e^{i2\pi\delta/\lambda}>|^2$) as a measure of the image quality and variation in wave root-mean square as figures of merit.

If desired, at block 995, the grid mapping results may be refined based on initial results and new computational fluid dynamics results may be generated for the optical sensor at an alternate operating condition. After this step, the process may go back to block 950 and iterate through a number of times desired by the person skilled in the art.

Summarizing the simulation results illustrating the major and the associated embodiments the following can be concluded. The direct simulations for aerodynamic flow and the accompanying heat transfer may be carried out for multiple collocation points in the "near wall" proximity. The calculations of thermal fields may be completed for the same grid system used for the air velocity field. The effect of "a thermally conductive inclusion(s)" on the structure of the near-wall turbulence and the main streams may be precisely simulated and the associated coupling taken into account. The heat transfer simulations may be carried out at a constant heat flux wall (window perimeter) boundary condition.

The results performed for conventional windows and windows having "a thermally conductive inclusion(s)" were correlated to define the reduction of thermal gradients. Obtained results indicate enhancements of heat transfer coefficient associated with a flow motion toward the window surface, often exceeding 25% in magnitude. They also emphasize the high thermal gradients adversely affecting both the structural and aero-optical performance of the window segments. In the case of a window having "a thermally conductive inclusion(s)" the thermal pattern around the window was investigated for different shapes of the proposed thermally-conductive blades. It was shown that the high thermal gradient associated with the conventional windows can be reduced significantly. The thermal elastic stresses can be also reduced. Therefore, the simulations of thermal and stress fields demonstrated strong possibility of equalization of thermal fields by means of a correctional type of air flow perturbation that can be obtained by introduction of thermally conductive components.

These components may be characterized by one or more of the following aspects:
1. Shape and dimensional parameters (protrusion) of blades are compatible to the depth of Prandtl layer;
2. Materials used for fabrication of blades, including the composites utilizing the structural alloys and highly conductive graphite and CNT yarns, are characterized by high thermal conductivity and diffusivity. For example, the conductivity of single and nearly perfect individual tube CNTs for the long axis approaches 6600 W/M K. Multi-wall commercial CNTs exhibit the conductivity of 2000-3000 W/m K. Specific heat depends on random orientation of the short CNT fibers and may vary from 0.7 to 0.85 J/g K
3. The blades conduct the accumulated heat to the window frame, which in turn becomes an efficient thermal spreader;
4. The stiffness of blades is suitable to withstand high local air pressure;
5. The shape of blades is aerodynamically compatible to the pod frame, so their introduction has relatively small effect on the aerodynamic resistance of the sensor pod itself;
6. Conductive blades may carry electric current and employ Joule heating synergistically by using materials with temperature dependent resistivity favorable for increased localized heat dissipation at colder temperatures;
7. Crystal or ceramic window can have an EMI type conductive coating which can be connected to the metal blades and pod structure.
8. Generalizing, the blades protruding into the near-wall turbulent layer are causing localized perturbations primarily affecting velocity and temperature distributions within the effective thickness. Dissimilarity between the velocity and temperature fields causes the localized phenomena of blowing and/or suction.

The described embodiments are considered illustrative, so that those having skill in the art can further detail the shape of blades, the dimensional parameters of windows and blades, as well as the thermal management options upon reading and understanding the present disclosure.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of using an optical window, the method comprising:
   exposing the optical window to an air flow, wherein the optical window has thermally conductive blades between adjacent edges of panes of optically transmissive material of the optical window, and wherein the air flow flows past heads of the blades and outer surfaces of the panes; and
   viewing with a sensor through the optical window, into the air flow;
   wherein the panes are made of a crystal or ceramic material selected from the group consisting of polycrystalline ZnS, ZnSe, sapphire, and spinel;
   wherein heads of the thermally conductive blades protrude into the air flow so as to move an adverse flow stagnation zone forward of the outer surfaces of the panes; and
   wherein the heads of the blades have backward-swept arms, spaced away from the panes, that cause, during the exposing of the optical window to the air flow, enhanced mixing between relatively hot air of the air flow near the panes, and relatively cold air of the air flow further from the panes.

2. The method of claim 1, wherein the exposing includes exposing the optical window to the air flow at a supersonic velocity.

3. The method of claim 1, wherein the exposing includes exposing the optical window to the air flow at a hypersonic velocity.

4. The method of claim 1, wherein the exposing includes exposing the optical window to the air flow at a velocity of 0.5 Mach to 2 Mach.

5. The method of claim 1, further comprising heating the panes by heating of the blades.

6. The method of claim 5, wherein the heating of the blades is used to reduce temperature gradients of the panes.

7. The method of claim 5, wherein the heating of the blades includes electrical heating of the blades.

8. A method of improving optical characteristics of a multi-segmented infrared window of an infrared sensor system of an aircraft, the window having at least four panes, the method comprising:
   providing conductive blades between the panes, with the blades made of a thermally conductive material that is more thermally conductive than the panes, wherein the blades are each positioned between adjacent edges of adjacent of the panes, the adjacent edges being adjacent to, parallel with, and at least partially coextensive with each other, with edges of the blades parallel to and in contact with the adjacent edges of the adjacent of the panes, and wherein the blades each have a head that extends beyond outer surfaces of the panes, into an air flow past the windows while the aircraft is in flight; and
   modifying turbulent flow in the air flow past the windows while the aircraft is in flight, using the heads of the blades, wherein the modifying the turbulent flow produces more regular flow attachment to the window than in the absence of the blades, reducing thermal gradients and optical distortion occurring from variable refractivity of air in a boundary layer of the flow along the window.

9. The method of claim 8, wherein the modifying the turbulent flow includes the heads of the blades enhancing flow mixing within the boundary layer.

10. The method of claim 9, wherein the enhancing flow mixing includes enhancing mixing of relatively hot air from the boundary layer with relatively cold air from outside the boundary layer.

11. The method of claim 8, wherein the providing includes providing, for each of the blades, the head with a pair of linear backward-swept arms that overlie parts of the outer surface of the adjacent of the panes.

12. The method of claim 8, wherein the panes are made of a crystal or ceramic material selected from the group consisting of polycrystalline ZnS, ZnSe, sapphire, and spinel.

13. The method of claim 8, wherein the providing includes providing the panes angled with respect to each other, with the outer surfaces of the panes forming a convex outer surface of the window that is exposed to the air flow, whereby angles between the panes minimize radar cross-section and infrared recognition of the window.

14. A method of improving optical characteristics of a multi-segmented infrared window of an infrared sensor system of an aircraft, the window having at least four panes, the method comprising:
providing conductive blades between the panes, with the blades made of a thermally conductive material that is more thermally conductive than the panes, wherein the blades are each positioned between adjacent edges of adjacent of the panes, the adjacent edges being adjacent to, parallel with, and at least partially coextensive with each other, with edges of the blades parallel to and in contact with the adjacent edges of the adjacent of the panes, and wherein the blades each have a head that extends beyond outer surfaces of the panes, into an air flow past the windows while the aircraft is in flight; and
lifting an adverse flow stagnation zone forward of the optical window away from the panes, by protruding the head on one of the blades into the air flow forward of the window.

15. The method of claim 14, wherein the step of lifting includes spacing a head of the blade from the surface of the panes.

16. The method of claim 14, further comprising:
moving at least a portion of the blade with respect to the panes to control spacing between a leading edge of the blade and the panes.

17. The method of claim 14, further comprising heating a heating element thermally associated with the blade to heat the blade.

18. The method of claim 14, further comprising thermally coupling the blade to a conductive frame.

19. A method of using an optical window, the method comprising:
exposing the optical window to an air flow that is supersonic or hypersonic, wherein the optical window has thermally conductive blades between adjacent edges of panes of optically transmissive material of the optical window, and wherein the air flow flows past heads of the blades and outer surfaces of the panes; and
viewing with a sensor through the optical window, into the air flow;
wherein the panes are made of a material selected from the group consisting of polycrystalline ZnS, ZnSe, sapphire, and spinel;
wherein heads of the thermally conductive blades protrude into the air flow so as to cause mixing in the air flow that mitigate thermal gradients within the panes; and
wherein the heads of the blades have backward-swept arms, spaced away from the panes, that cause, during the exposing of the optical window to the air flow, enhanced mixing between relatively hot air of the air flow near the panes, and relatively cold air of the air flow further from the panes.

20. The method of claim 19, further comprising varying the extension of the heads into the flow, thereby controlling mixing in the air flow and the temperature gradients within the panes.

* * * * *